US007880584B2

(12) United States Patent
Larson et al.

(10) Patent No.: US 7,880,584 B2
(45) **Date of Patent: *Feb. 1, 2011**

(54) LOCKBOX KEY WITH CALLBACK FEATURE

(75) Inventors: Wayne Floyd Larson, Salem, OR (US); Michael Harkins, Portland, OR (US); Casey Fale, Portland, OR (US); Teri Lynné Briskey, Monmouth, OR (US); Jerry Switzer, West Linn, OR (US)

(73) Assignee: UTC Fire & Security Americas Corporation, Inc., Bradenton, FL (US)

( * ) Notice: Subject to any disclaimer, the term of this patent is extended or adjusted under 35 U.S.C. 154(b) by 952 days.

This patent is subject to a terminal disclaimer.

(21) Appl. No.: 11/469,183

(22) Filed: Aug. 31, 2006

(65) Prior Publication Data

US 2007/0290798 A1 Dec. 20, 2007

Related U.S. Application Data

(63) Continuation-in-part of application No. 11/422,775, filed on Jun. 7, 2006.

(51) Int. Cl.

| | |
|---|---|
| ***B60R 25/00*** | (2006.01) |
| ***G06K 19/00*** | (2006.01) |
| ***H04L 9/14*** | (2006.01) |
| ***H04L 9/32*** | (2006.01) |
| ***G08B 5/22*** | (2006.01) |
| ***H04Q 1/30*** | (2006.01) |
| ***G06F 7/04*** | (2006.01) |

(52) U.S. Cl. ...................... 340/5.73; 340/5.2; 340/5.28; 340/7.5; 340/5.5

(58) Field of Classification Search ................ 340/5.73, 340/5.2–5.22, 5.28, 5.6–5.61, 7.21–7.23, 340/7.46, 7.5, 5.5

See application file for complete search history.

(56) References Cited

U.S. PATENT DOCUMENTS

| | | | | |
|---|---|---|---|---|
| 4,916,443 | A * | 4/1990 | Barrett et al. | 340/5.33 |
| 5,459,458 | A * | 10/1995 | Richardson et al. | 340/825.52 |
| 5,475,375 | A * | 12/1995 | Barrett et al. | 340/5.25 |
| 6,006,068 | A * | 12/1999 | Elkin et al. | 340/7.44 |
| 6,072,402 | A * | 6/2000 | Kniffin et al. | 340/5.28 |
| 6,472,973 | B1 * | 10/2002 | Harold et al. | 340/5.73 |
| 2004/0160304 | A1 * | 8/2004 | Mosgrove et al. | 340/5.21 |
| 2005/0074023 | A1 * | 4/2005 | Wall | 370/432 |
| 2006/0092644 | A1 * | 5/2006 | Mok et al. | 362/327 |

* cited by examiner

*Primary Examiner*—Benjamin C Lee
*Assistant Examiner*—Michael Shannon
(74) *Attorney, Agent, or Firm*—Armstrong Teasdale LLP

(57) ABSTRACT

An access device is provided for a system that has a plurality of locks that are each configured to receive instructions and to energize a lock mechanism to unlock the lock and a computer that is disposed at a remote location from the locks and that is connected to a primary wireless communication path. The access device includes at least one key configured for communicating with the computer via the primary wireless communication path and to communicate with the locks over a secondary wireless path. The at least one key is also configured to send a predefined text message for receipt by the computer and wherein the predefined text message provides an indication to the computer as to at least one other key whereto the predefined text message is to be sent.

15 Claims, 5 Drawing Sheets

LOCKBOX KEY WITH CALLBACK FEATURE

CROSS REFERENCE TO RELATED APPLICATIONS

This application is a continuation-in-part of U.S. patent application Ser. No. 11/422,775, entitled “Access Control System”, filed Jun. 7, 2006.

BACKGROUND OF THE INVENTION

1. Field of the Invention

The subject matter described herein relates generally to wireless lockbox key systems.

2. Related Art

Wireless access to lockboxes for use in real estate sales is known. For example, U.S. Pat. No. 6,072,402 illustrates a secure entry system including a lock having an integrated RF receiver and a clearing house connected to a database. A user, who seeks access, communicates via a fixed or mobile phone with the clearing house. If the clearing house determines, by reference to the database, that the user should be authorized to access the lock, the clearinghouse causes a transmission to the lock to be made. This authorization is valid for only a short time such as thirty minutes.

U.S. Pat. No. 6,472,973 describes adding a wireless radio link to a lock box to transfer the data obtained from an access key pad, located on the lock box, to a co-located collector transmitter unit which sends the data to a central site computer. The collector-transmitter unit is installed in the lock box to intercept the exchange of information between the keypad and the lock box and transmit this data by radio to a nearby receiver unit.

However, to date, no suitable device or method of providing easy, reliable and secure access to an entryway is available. Also, these patents fail to provide for the illumination of a lock where ambient lighting is minimal. For example, where a real estate sales agent is required to show a property in the evening, adequate lighting of the property entry way may be nonexistent. Further, these patents fail to provide a suitable solution to a situation where an operator requires a professional detachment from an uncomfortable situation that arises. For example, circumstance may arise where a real estate agent is engaged to show a property and, upon meeting a potential buyer, lacks confidence that an appropriate showing will occur, and thus wishes to terminate the showing in a professional manner.

BRIEF DESCRIPTION OF THE INVENTION

In accordance with one aspect of the present invention, a wireless lockbox key system comprises a plurality of locks, each configured to receive instructions and to energize a lock mechanism to unlock the lock, and a computer disposed at a remote location from the at least one lock and configured to communicate over a primary wireless communication path. The wireless lockbox key system also comprises a plurality of keys configured to communicate over the primary wireless communication path with the computer and to communicate with each of the locks over a secondary wireless path. The keys are configured to send and receive authorization/deauthorization instructions and usage data to and from the computer and wherein each of the keys are also configured to send a predefined text message for receipt by the computer. The computer may also be configured to receive the predefined text message and to communicate the predefined message to at least one selected key.

In another aspect of the invention, an access device is provided for a real estate lock box system that has a plurality of locks that are each configured to receive instructions and to energize a lock mechanism to unlock the lock and a computer that is disposed at a remote location from the locks and that is connected to a primary wireless communication path. The access device comprises at least one key configured for communicating with the computer via the primary wireless communication path and to communicate with the locks over a secondary wireless path. The at least one key is also configured to send a predefined text message for receipt by the computer and wherein the predefined text message provides an indication to the computer as to at least one other key whereto the predefined text message is to be sent.

A method of requesting a call back that is usable with a system having a plurality of locks that are each configured to receive instructions and to energize a lock mechanism to unlock the lock and a computer disposed at a remote location from each of the locks. The computer is connected with a primary wireless communication path and the method comprises providing at least one key configured for communicating with the computer via the primary wireless communication path and for communicating with a lock via a secondary wireless communications path; and configuring the at least one key to send a predefined text message for receipt by the computer and wherein the predefined text message provides an indication to the computer as to at least one other key whereto the predefined text message is to be sent.

BRIEF DESCRIPTION OF THE DRAWINGS

The following detailed description is made with reference to the accompanying drawings, in which.

DETAILED DESCRIPTION OF THE PREFERRED EMBODIMENT

One embodiment of the present invention concerns a device and a method for providing security that is less cumbersome and easier to use relative to current systems. For example, rather than requiring that authorization be obtained prior to gaining access, in this embodiment, authorization for a key to access a building or an entryway is set as valid unless the key is instructed otherwise, or the key has not detected proper access to the primary wireless communications path for the some previously set time frame. In this case, the key will de-authorize itself until primary wireless communication access is re-established.

In this embodiment, a secured system comprises a computer, a key configured to communicate with the computer and a lock that is configured to receive instructions from the key. As used herein, the term computer may refer to any device or devices capable of carrying out a set of instructions such as one or more processors, servers or microprocessors. Also, as used herein, the term key may refer to any device or devices for controlling or accessing operation of another device and the term lock may refer to any device or devices for preventing access to an opening such as that covered by a door.

Figure 1:
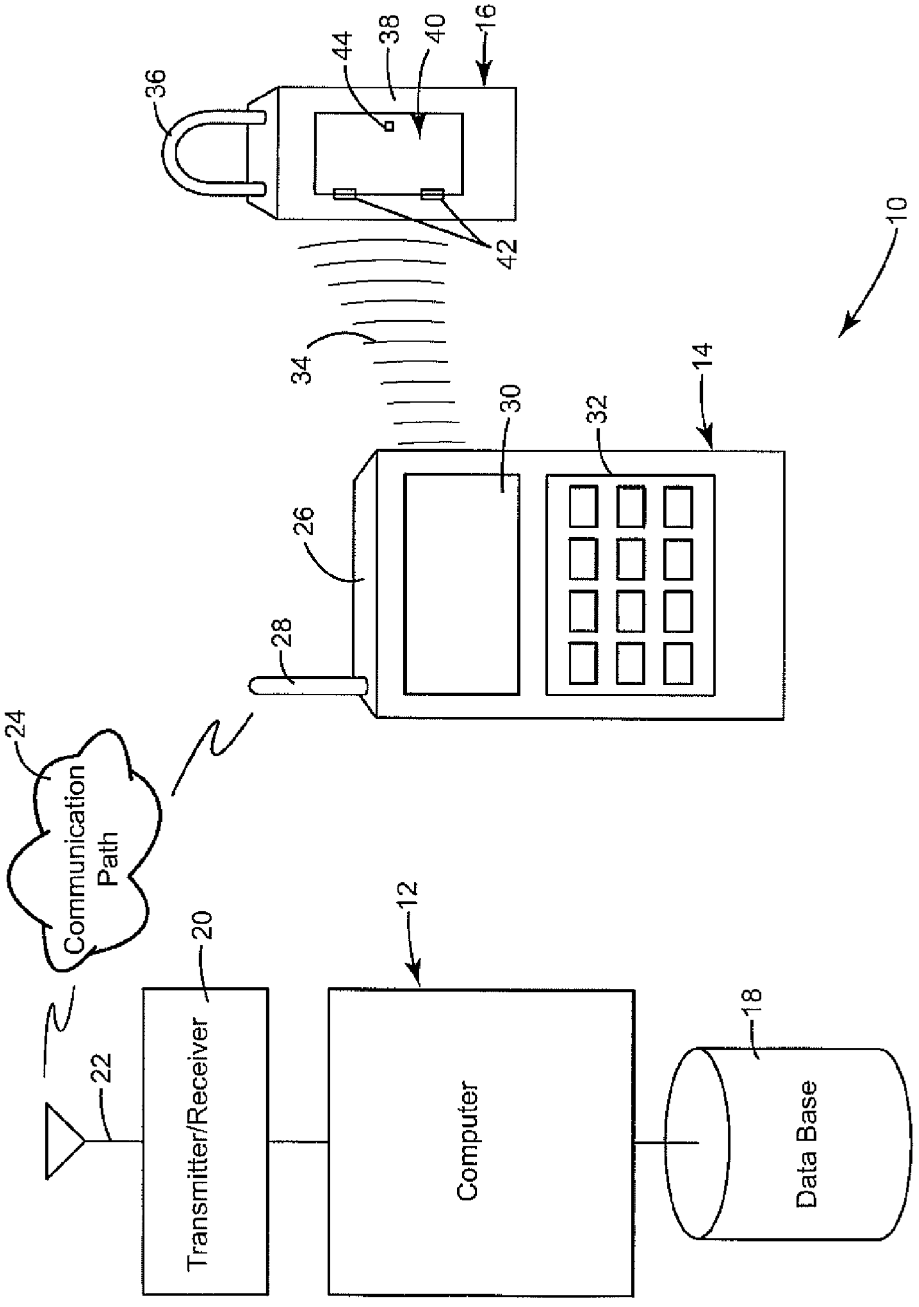
FIG. 1 is a perspective view, party in schematic, of a wireless lockbox key system showing a computer, a key and a lock in accordance with an embodiment of the present invention.

Referring now to FIG. 1, a security or access system, in accordance with an embodiment of the present invention, is illustrated generally at 10. In this embodiment, the access system 10 is configured for use in real estate sales, although, it will be understood that this is only one embodiment and one of ordinary skill in the art would readily adapt this embodiment of the invention for other applications such as for a delivery truck or industrial site security. As illustrated, the access system 10 comprises a computer 12, a key 14 and a lock 16. It will be appreciated that in this embodiment, and although not illustrated as such, the access system 10 comprises a plurality of computers 12, keys 14 and/or locks 16.

The computer 12 is any known device for following a set of instructions, such as those contained in software and/or firmware, and is interconnected with, or includes, a database 18 and a transmitter/receiver 20. The database 18 includes in one embodiment information concerning unique identifiers for the keys 14, unique identifiers for each lock 16, information concerning a particular real estate agent, house showing particulars, house alarm system particulars, other arrangements for showing the house, location of a particular lock, etc. The transmitter/receiver 20 is preferably capable of communicating over a wireless telecommunication system, although, any suitable wireless communication system such as RF or wireless internet may be employed. The transmitter/receiver 20 communicates via an external or internal antenna 22 over a primary communication path 24, which, in the case of a wireless telecommunication system, comprises multiple communication cells.

As illustrated, the key 14 transmits/receives signals from the transmitter/receiver 20 via the primary communication path 24. Preferably, the signals are encrypted or subject to a security code scheme that changes, such as by hopping or rolling in a known manner, periodically, e.g., every twenty-four hours. In one embodiment, the key 14 comprises a shell or housing 26, an antenna 28, a display 30 and a key pad 32. The housing 26, as illustrated, has a slim outer configuration, e.g. having a dimension of less than about one inch (2.54 centimeters) in depth and comprises an inner cavity (not shown). The housing 26 is fabricated in any known manner, for example, by injection molding of a plastic or other similar material. The antenna 28 is configured in a known manner to transmit/receive signals sent over the primary communication path 24 and the display 30 is of any type that presents a suitably clear image such as a liquid crystal. The key pad 32 is any configuration that is suitably durable and easy to use, for the entry of data as described in more detail below. The key 14 is further configured, as also described in more detail below, to communicate with the lock 16, via signals 34.

The lock 16, as illustrated, is configured as a lock box used in real estate sales and, as such, is removably mountable, e.g., to a door of a residence (both not shown), via a bracket 36. The lock 16 has a housing 38 that, in one aspect, includes a door 40 which, in turn, comprises hinges 42 and a knob 44. The bracket 36, the housing 38 and door 40 comprises a material, such as a metallic material, that is sufficiently strong and durable to prevent damage or unauthorized access. A compartment (not shown) accessed via the door 40 may contain, e.g., a mechanical door key (not shown) for unlocking the door of the residence.

Figure 2:
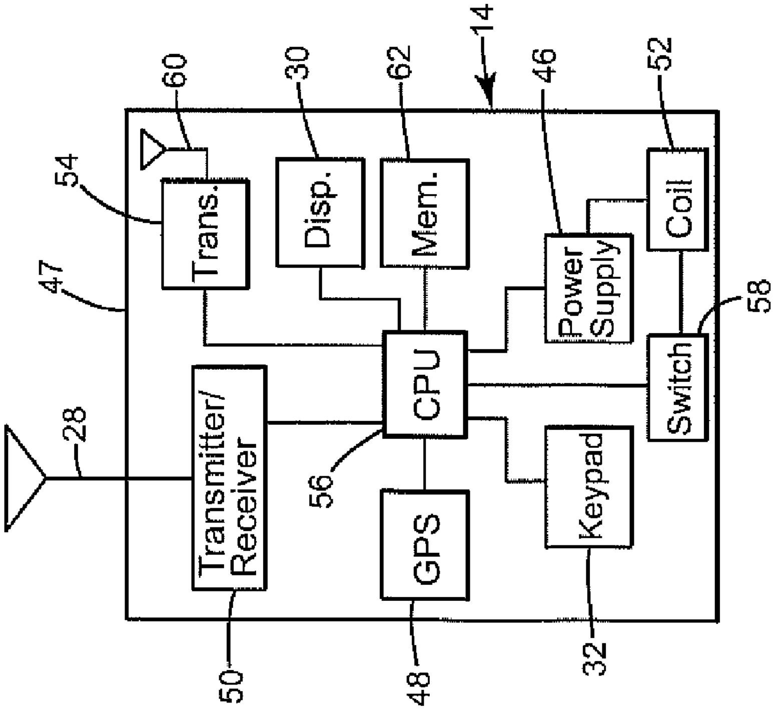
FIG. 2 is a schematic diagram of the key of FIG. 1.

Referring now to FIG. 2, one embodiment of a circuit 47 that may be located within the inner cavity (not shown) of the housing 26 (FIG. 1) of the key 14 is shown. The key 14 in one embodiment comprises a circuit having a power source 46, a global position satellite (GPS) receiver 48, a transmitter/receiver 50, an energizing coil 52, a transmitter 54 and a central processing unit (CPU) 56 connected in circuit with each of the foregoing. The power supply 46 comprises any self-contained source such as a battery, which preferably is rechargeable, and that is able to energize each of the electrical components of the circuit 47, as will be appreciated, for a reasonable period of time. In an optional embodiment, a GPS receiver 48 is employed to provide position coordinates to the CPU 56, for example, for confirming the location of a particular lock 16. The transmitter/receiver 50 is connected to the antenna 28, as described above, and is configured for communicating, via the primary communication path 24, information sent to/from the CPU 56. As such, the transmitter/receiver 50 is preferably capable of cellular communications, however, the transmitter/receiver 50 is capable of receiving signals via other means of communications, e.g., WIFI or RF.

In another optional embodiment, a coil 52 is connected to a switch 58 controlled by the CPU 56 for assisting in energizing the lock 16 through magnetic/electrical field coupling with a coil (described in more detail below) that is located at the lock 16. The CPU 56 is configured to control the switch 58 to energize the coil 52, when the accessing the lock 16. An additional transmitter 54 and antenna 60 are provided for communicating instructions via a secondary communications path from the CPU 56 to the lock 16. The transmitter 54 is preferably configured for infrared communications (IRDA), or near field wireless communication and thus may use a frequency that is appropriate for such a short distance. One embodiment includes a system that functions in the 300 to 400 MHz range and that has a changing code scheme that corresponds to that employed in the primary communication path 24, as described above. In another embodiment the transmitter 54 is configured to communicate using optical technology, such as at an infrared frequency.

The CPU 56 comprises any processor, microprocessor, controller, or other device that is configured to follow a set of instructions provided in software and/or firmware instructing the CPU, for example, to receive input via the key pad 32, send/receive data/instructions from the computer 12, display information to a user and send instructions to the lock 16. To assist in accomplishing the foregoing, the CPU 56 is connected in circuit with a memory device 62. The memory device 62 comprises an erasable programmable read only memory, random access memory or any other suitable memory device for storing instructions for operating the CPU 56 and for storing data transmitted to/from the computer 12. Also, where the transmitter/receiver 50 is located out of a service area as occurs during cellular communications, the memory 62 is configured for providing spooling of usage data such as time of access of a particular lock 16, duration of access to the particular lock and/or location of the particular lock.

Figure 3:
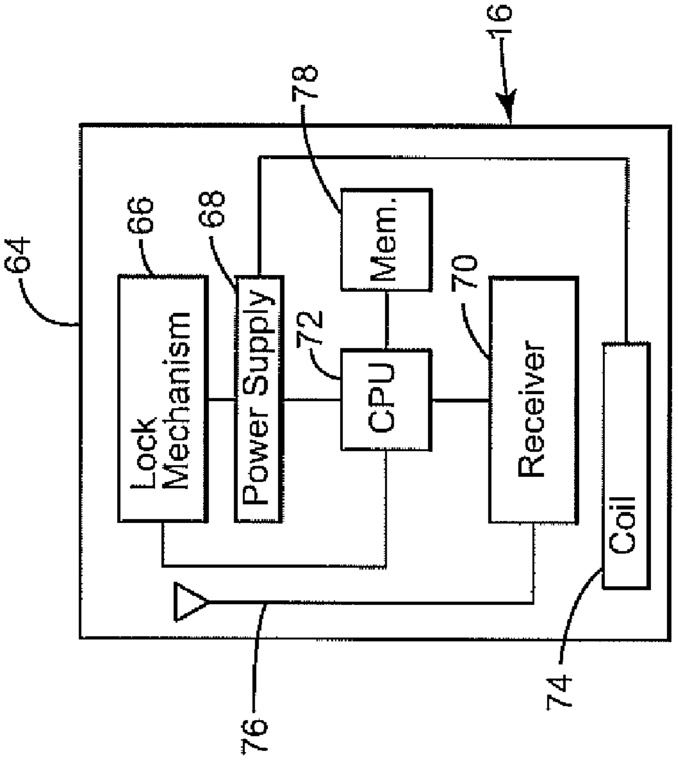
FIG. 3 is a schematic diagram of the lock of FIG. 1.

Referring now also to FIG. 3, an embodiment of a circuit 64 that is located in the compartment (not shown) of the lock 16 comprises a lock mechanism 66, a power supply 68, a receiver 70 and a CPU 72. The lock mechanism 66 comprises any suitable device for providing access through the door 40 (FIG. 1) as described above. The power supply 68 is similar to the power supply 46 described above and, in one embodiment, comprises a rechargeable battery. In another optional embodiment, the power supply 68 is connected in circuit with a coil 74 that functions to receive energy from the coil 52 for assisting in powering the circuit 64 and/or recharging the power supply. The receiver 70 is configured to communicate with the transmitter 54, as described above, via an antenna 76.

The CPU 72 is similar to the CPU 56 and may be any processor, microprocessor, controller, or other device that is configured to follow a set of instructions provided in software and/or firmware. The CPU 72 may function, to, among other things, receive instructions from a particular key 14 via the receiver 70 and, in response thereto, energize a particular lock mechanism 66 for access by an operator as described above. The CPU 72 is connected in circuit with a memory device 78 that is similar, and performs a similar function, to the memory device 62 described above.

With reference to FIGS. 1-3, an embodiment of the present invention will now be described in the application of real estate sales, although, it will be appreciated that this is merely for illustration. Also, in this application, a particular lock 16 comprises a lock box that is located at an opening of a building (not shown) that is available for sale. Access to the building may be granted by virtue of the owner giving the listing real estate agent the physical key to the house. Any agent authorized to show houses in the listing board's area has an assigned key 14, and can access the house. The agent's authorization status is communicated to the computer 12 for entry into the database 18. Any change of the agent's authorization status is also communicated to the computer 12 for entry into database 18, Once this change in authorization status data is entered into the database 18, the computer 12 is configured to communicate this authorization information to the key 14 assigned to that agent. The CPU 56 of the key 14 is configured to store this authorization status data in the associated memory device 62. The CPU 56 is further configured to operate on a valid status marking as long as the key 14 maintains an active connection to the primary communication path 24 for greater than some set valid time window, for example, a five-minute time period, within the automatic authorization time period of, for example twenty-four hours. If the key 14 has not achieved the access to the primary communication path 24 for the valid time window within the automatic authorization time period, the CPU 56 is configured to operate as if the authorization is invalid and to prevent operation of the key 14 from gaining access to any lock 16. The CPU 56 is also configured, such that when it is once again in contact with the primary communication path 24 for the minimum valid time window, CPU 56 is configured to once again operate on its valid status marking unless a de-authorization message is received from the computer 12 to set the authorization status data as invalid Where the CPU 56 of the key 14 recognizes valid authorization status data and upon initiation through, e.g., a pin and password entered into the key pad 32 of the key by a real estate professional, the CPU 56 is configured to send an instruction to the transmitter 54 for communication to the receiver 70 of the lock 16. In turn, the CPU 72 of the lock 16 receives the instruction along with the particular key's unique identifying code to grant access from the receiver 70 and energizes the lock mechanism 66 to do so.

Following sending the instruction to the lock 16, the CPU 56 of the key 14 is configured to send usage data to the computer 12 under a particular key identifier, a unique lock identifier and time of access for the lock 16. Also, in one embodiment, the CPU receives global positioning satellite data from the GPS 48 and then additionally forwards the location of the key 14 in accessing the particular lock 16 to the computer 12. Also, the CPU 56 may spool the usage data when not within the service area of the communications path 24.

In operation, when a real estate agent desires to show a particular house, the agent approaches within ten feet (3.05 Meters) or so of a lock 16 located, e.g., on a door knob of a door to the particular house. Thereafter, the agent may use the keypad 32 of the key 14 to enter a username/password and any particular key sequence required for communicating an instruction to the lock 16 for opening of the door 40 of the lock 16. Thereafter, the agent may take a mechanical key out of the lock 16 for entry to the house. At this time the key 14 communicates the specific house showing information via primary communication path 24 to the computer 12.

Figure 4:
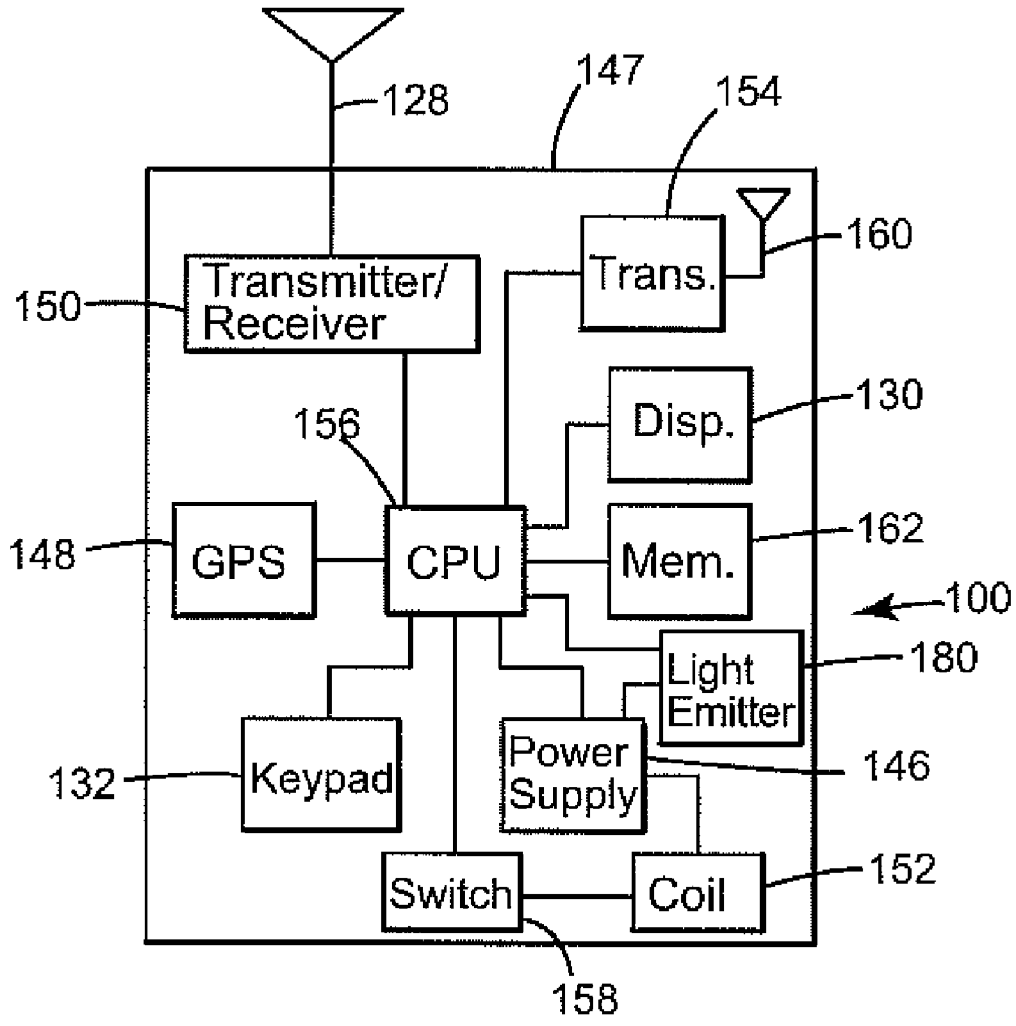
FIG. 4 is a schematic diagram of a key in accordance with another embodiment of the present invention.
Figure 5:
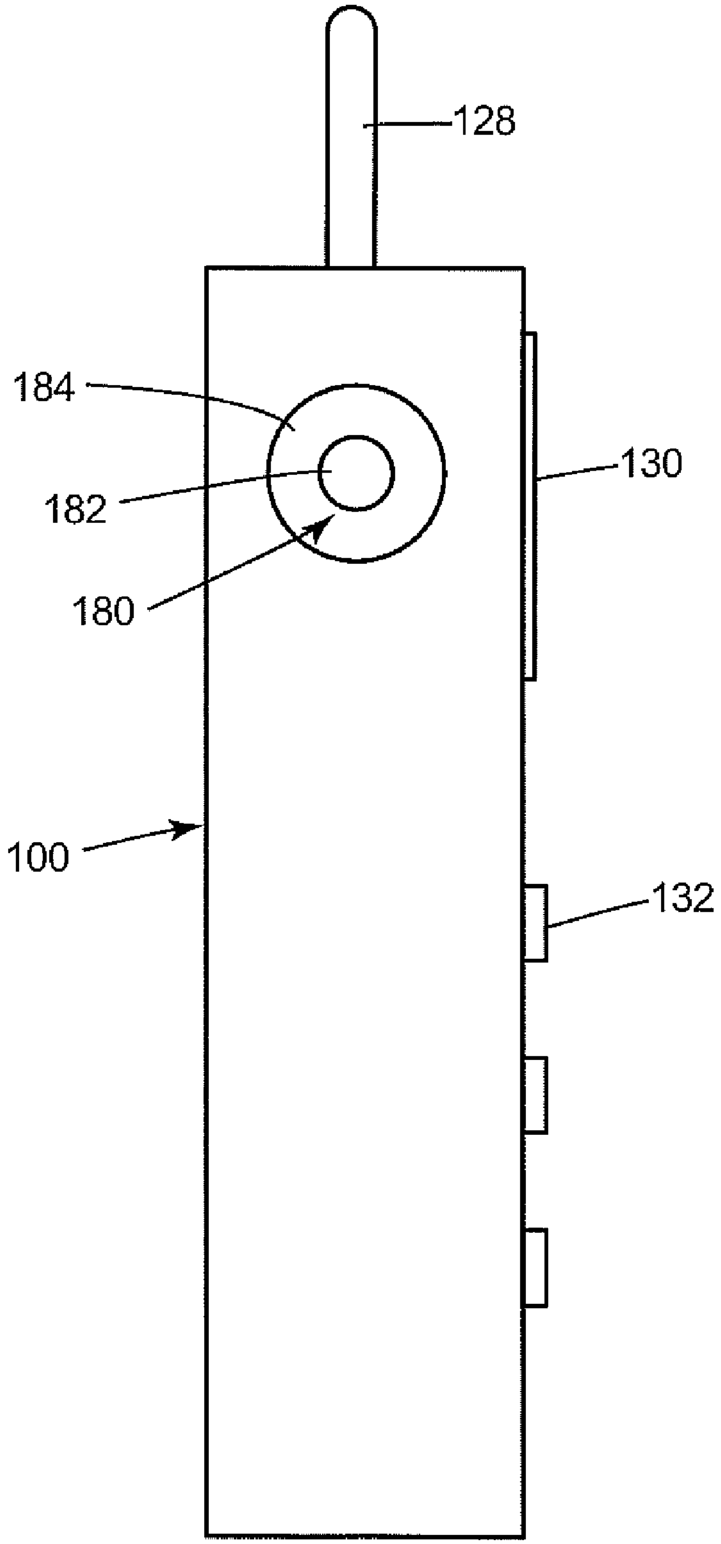
FIG. 5 is a side view of the key of FIG. 4.

Referring now to FIGS. 4 and 5, another embodiment of a key in accordance with the present invention is illustrated generally at 100. In this embodiment, various components of the key 100 include items or components similar to those described above and each are labeled with like reference numbers similar to those described above, although, each is preceded by a 1. For example, antenna 128 is similar to the antenna 28 (FIGS. 1 and 3) described above. To avoid redundancy, reference may be had above for a description of many of the items or components shown in FIGS. 4 and 5.

In this embodiment, the key 100 comprises a light emitter 180 that radiates a directed beam of electromagnetic energy that has a frequency that is in the visible spectrum. The light emitter 180 is connected to the CPU 156 and the power supply 146. In response to an instruction given via the keypad 132, or an optional dedicated key or button (not shown), the CPU 156 may cause the power source or supply 146 to energize the light emitter 180. In another optional embodiment, a separate power source (not shown) such as a battery may be employed.

In one embodiment, the light emitter 180 comprises a light emitting diode (LED) 182. A reflector 184 is provided in an optional embodiment and is configured, e.g. in a parabolic shape, to reflect light from the LED 182 in the form of a beam. In another optional embodiment, rather than a LED 182, the light emitter 180 comprises an incandescent light bulb. As shown, the light emitter 180 is located on a different surface from that where the keypad 132 is located, although, it will be appreciated that any surface is usable.

It will be appreciated that the light emitter 180 may be advantageously used to, e.g., illuminate a lock 16 where sufficient ambient light is unavailable.

Figure 6:
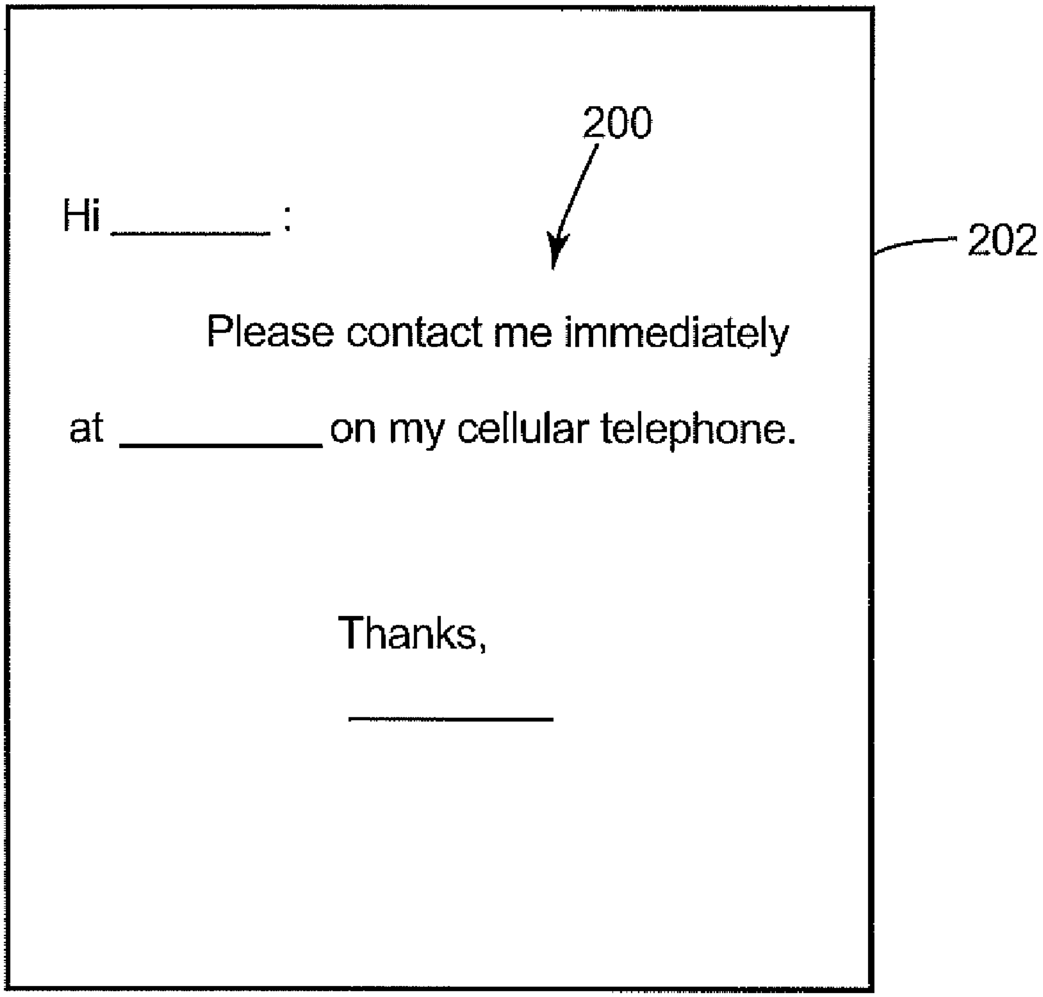
FIG. 6 is a diagram showing a text message sent in accordance with the present invention.

In another embodiment of the present invention, usable in conjunction with the embodiments of either of FIGS. 1-3 or 4-5, either key 14 or 100 is further configured to provide for the sending of a predefined message such as a text message requesting a call back in a situation, for example, of a real estate agent requiring a professional cancellation of an appointment, as described above. In such a case and referring now to FIGS. 1 and 4, the keypad 32, 132 of either of keys 14 or 100, includes, in one embodiment, an individual button (not numbered) that functions to generate a text message 200 as shown in the screen shot 202 provided in FIG. 6, for communication to one or more selected keys 14, 100 and/or cellular telephones, personal digital assistants, etc. (not shown). In an optional embodiment, rather than a dedicated single button, the CPU 56, 156 (FIGS. 2, 4) may be configured to accept a number of button strokes, with reference to display 30, 130, to prepare and send the text message 200.

It will be understood that the keys 14, 100 are configured to provide for a particular distribution of the text message 200 as desired by an operator. In the present exemplary embodiment of a real estate sales agent operator that requests a call back to arrange for extraction from an uncomfortable situation, it may be desired that the text message be sent to the agent's supervisor, administrative assistant and/or co-workers to be sure that someone is available to make the extraction call. In one particular embodiment, sufficient storage (such as in memory 162 shown in FIG. 4) is provided for up to five destination addresses where the text message 200 is sent.

The text message 200 is sent from the key 14, 100 via the communication path 24 to the computer 12 that is configured to receive instructions for the communication of the text message to the particular key(s) 14, 100.

Technical effects of the herein described method include determining whether authorization exists for gaining access to an entryway and, where it exists, effecting opening of the entryway. Other technical effects include communicating usage data to a remote computer for further processing and communicating text messages to the computer for transmission to other keys and/or cellular telephones, PDAs, etc.

While the present invention has been described in connection with what are presently considered to be the most practical and preferred embodiments, it is to be understood that the present invention is not limited to these herein disclosed embodiments. Rather, the present invention is intended to cover all of the various modifications and equivalent arrangements included within the spirit and scope of the appended claims.

What is claimed is:

1. A wireless lockbox key system, comprising:

a plurality of locks each configured to receive instructions from one or more of a plurality of keys to energize a lock mechanism to unlock a respective lock;

a computer disposed at a remote location from each of the locks and configured to communicate over a primary wireless communication path; and each of the plurality of keys configured for communicating over the primary wireless communication path with the computer, and for communicating with the locks over a secondary wireless path and wherein the computer sends authorization/deauthorization instructions to the plurality of keys, each of the plurality of keys being authorized to unlock at least one of the plurality of locks absent either (a) receiving a deauthorization instruction from the computer over the primary wireless communication path, or (b) a determination that a respective key has not been in contact with the computer over the primary wireless communication path during and/or lasting a predetermined period of time, and wherein each of the keys send usage data to the computer, each of the plurality of keys configured to send a predefined text message addressed to at least one device via the computer, wherein the computer is configured to communicate the predefined message to the at least one device.

2. The key system of claim 1, wherein each of the keys are also configured to radiate a directed beam of electromagnetic energy that has a frequency that is in the visible spectrum and that is usable to illuminate a lock.

3. The key system of claim 2, wherein each of the keys is configured to generate and communicate, upon receipt using a unique key identifier, usage data to the computer comprising at least one of a unique lock identifier, and a time of access for each lock.

4. The key system of claim 2, wherein the keys are configured to receive global positioning satellite data and to process and spool the usage data when not in contact with a primary wireless telecommunications network.

5. The key system of claim 2, wherein each of the locks and each of the keys are configured to communicate there between using near field RF communications.

6. The key system of claim 2, wherein each of the locks is located on a lock box used in real estate sales.

7. The key system of claim 4, wherein each of the keys is configured to generate and communicate its location information to the computer.

8. An access device for a system having a plurality of locks that are each configured to receive instructions from at least one key to energize a lock mechanism to unlock the lock, and a computer disposed at a remote location from each of the locks, the computer being connected with a primary wireless communication path, the access device comprising:

the at least one key configured to communicate instructions to at least one of the plurality of locks via a secondary wireless communication path, the at least one key being authorized to unlock at least one of the plurality of locks absent either (a) receiving a deauthorization instruction from the computer over the primary wireless communication path, or (b) a determination that the at least one key has not been in contact with the computer over the primary wireless communication path during and/or lasting a predetermined period of time, the at least one key configured to send a predefined text message addressed to at least one device via the primary wireless communication path for receipt by the computer, wherein the computer is configured to communicate the predefined message to the at least one device.

9. The device of claim 8, wherein the at least one key comprises a plurality of keys.

10. The key system of claim 1, wherein sufficient storage is provided for five addresses whereto the predefined message may be sent and wherein the predefined text message states that a call back to retrieve an operator of a key of the plurality of keys from an uncomfortable situation is necessary.

11. The device of claim 9, wherein each of the plurality of keys are also configured to radiate a directed beam of electromagnetic energy that has a frequency that is in the visible spectrum and that is usable to illuminate a lock.

12. The device of claim 11, wherein each of the plurality of keys is configured to generate and communicate, upon receipt using a unique key identifier, usage data to the computer comprising at least one of a unique lock identifier, and time of access for each lock.

13. The device of claim 12, wherein each of the plurality of locks and each of the plurality of keys are configured to communicate therebetween at an infrared frequency.

14. The device of claim 12, wherein each of the plurality of locks are configured to be at least partially energized and/or partially recharged by any one of the plurality of keys.

15. The system of claim 1, wherein each of the locks is located on a lock box used in real estate sales.

* * * * *